(12) United States Patent
Mubarekyan et al.

(10) Patent No.: US 7,722,179 B2
(45) Date of Patent: May 25, 2010

(54) SLOW-PENETRATING INKJET FIXER COMPOSITION AND METHODS AND SYSTEMS FOR MAKING AND USING SAME

(75) Inventors: Ervin Mubarekyan, San Diego, CA (US); George M. Sarkisian, San Diego, CA (US); Keshava A. Prasad, San Diego, CA (US); Richard Anderson, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 547 days.

(21) Appl. No.: 11/395,979

(22) Filed: Mar. 30, 2006

(65) Prior Publication Data

US 2007/0229636 A1 Oct. 4, 2007

(51) Int. Cl.
*C09D 11/00* (2006.01)
(52) U.S. Cl. .................. 347/100; 106/31.13
(58) Field of Classification Search ................ 347/100; 106/31.13
See application file for complete search history.

(56) References Cited

U.S. PATENT DOCUMENTS

| 5,640,187 | A | | 6/1997 | Kashiwazaki et al. |
|---|---|---|---|---|
| 5,746,818 | A | | 5/1998 | Yatake |
| 6,471,347 | B1 | * | 10/2002 | Koitabashi et al. ............ 347/98 |
| 6,641,257 | B1 | * | 11/2003 | Shi et al. .................... 347/100 |
| 6,740,689 | B1 | * | 5/2004 | Lee et al. .................... 523/160 |
| 2004/0106696 | A1 | | 6/2004 | Ma et al. |
| 2006/0065155 | A1 | * | 3/2006 | Byers et al. .............. 106/31.43 |
| 2007/0076075 | A1 | * | 4/2007 | Schmid et al. .............. 347/102 |
| 2007/0100022 | A1 | * | 5/2007 | Mubarekyan et al. ....... 523/160 |

\* cited by examiner

*Primary Examiner*—Stephen D Meier
*Assistant Examiner*—Laura E Martin

(57) ABSTRACT

An inkjet fixer composition and a printing method and system used with the composition are disclosed herein. The composition includes: a) from 1 to 8 weight percent cationic polymer; and b) from 0 to 2 weight percent of at least one surfactant selected from the group consisting of nonionic surfactant, cationic surfactant and combinations thereof; and c) an aqueous liquid vehicle. Upon overprinting the fixer composition with an ink-jet ink on a substrate, the fixer composition vehicle and the ink-jet ink vehicle form a vehicle mixture on the substrate after which the vehicle mixture penetrates into the substrate, and an ink image is formed on the substrate.

16 Claims, 3 Drawing Sheets

SLOW-PENETRATING INKJET FIXER COMPOSITION AND METHODS AND SYSTEMS FOR MAKING AND USING SAME

FIELD OF THE INVENTION

The present invention relates to slow-penetrating inkjet fixer composition that combines with inkjet ink to achieve good image quality.

BACKGROUND OF THE INVENTION

In some reactive ink systems, fixers have been employed for the purpose of crashing colorants in ink. In inkjet printing, for example, fixer fluids are used to make reactive ink systems, whereby the fixer, upon contact with ink, causes the pigments and dyes in the ink formulation to precipitate out. The precipitated colorants deposit on the surface of the media, which results in the enhancement of image quality attributes, for example, optical density and chroma. Durability attributes like water-fastness and highlighter smear also benefit from such reactive ink chemistry. As a rule, both fixer and ink are formulated such that they reasonably well wet the media to which they are applied and quickly penetrate the media to avoid drytime related issues. This approach often results in non-uniform area fill, because the media itself is often inherently non-uniform. In areas where fiber density is low, fixer penetrates the media more quickly relative to denser areas. Consequently, ink colorants are precipitated out by the fixer at various depths from the media surface. These variations in depth are perceived as mottle (non-uniform area fill).

SUMMARY OF THE INVENTION

The present invention relates to an inkjet fixer composition comprising:
  a) from 1 to 8 weight percent of at least one cationic polymer; and
  b) from 0 to 2 weight percent of at least one surfactant selected from the group consisting of nonionic surfactant, cationic surfactant and combinations thereof;
  c) an aqueous liquid vehicle;

wherein the fixer composition is non-wetting in relation to the substrate; and wherein, the fixer composition underprints an ink-jet ink on a substrate, the inkjet ink comprising:
  a) an aqueous liquid vehicle; and
  b) a colorant.

wherein the fixer composition vehicle and the ink-jet ink vehicle form a vehicle mixture on the substrate after which the vehicle mixture penetrates into the substrate, and an ink image is formed on the substrate.

The present invention further relates to a method for printing durable ink-jet ink images, comprising:
  a) jetting a fixer composition onto the substrate, said fixer composition comprising
    i. from 1 to 8 weight percent of at least one cationic polymer;
    ii. from 0 to 2 weight percent of at least one surfactant selected from the group consisting of nonionic surfactant, cationic surfactant and combinations thereof;
    iii. an aqueous liquid vehicle;
  b) jetting an ink-jet ink onto the substrate of step (a), said ink-jet ink composition comprising
    i. an aqueous liquid vehicle;
    ii. a colorant;

wherein the fixer composition is non-wetting in relation to the substrate; and wherein, after the fixer composition is overprinted with the ink-jet ink composition, the fixer composition vehicle and the ink-jet ink vehicle form a vehicle mixture on the substrate after which the vehicle mixture penetrates into the substrate and an ink image is formed on the substrate.

In addition, the present invention relates to a system for printing durable ink-jet ink images, comprising:
  a) a first ink-jet pen containing a fixer composition, said fixer composition comprising
    i. from 1 to 8 weight percent of at least one cationic polymer;
    ii. from 0 to 2 weight percent of at least one surfactant selected from the group consisting of nonionic surfactant, cationic surfactant and combinations thereof;
    iii. an aqueous liquid vehicle;

wherein the fixer composition is non-wetting in relation to the substrate
  b) a second ink-jet pen containing an ink-jet ink composition, said ink-jet ink composition comprising
    i. an aqueous liquid vehicle;
    ii. a colorant; and wherein, upon overprinting the fixer composition with the ink-jet ink on a substrate, the fixer composition and the ink-jet ink form a mixture on the substrate; and wherein, upon overprinting the fixer composition with the inkjet ink composition on a substrate, the fixer composition vehicle and the ink-jet ink vehicle form a vehicle mixture on the substrate, after which the vehicle mixture penetrates into the substrate and an ink image is formed on the substrate.

BRIEF DESCRIPTION OF THE DRAWINGS

The patent or application file contains at least one drawing executed in color. Copies of this patent or patent application publication with color drawing will be provided by the Office upon request and payment of the necessary fee.

DETAILED DESCRIPTION OF EMBODIMENTS OF THE INVENTION

Figure 1:
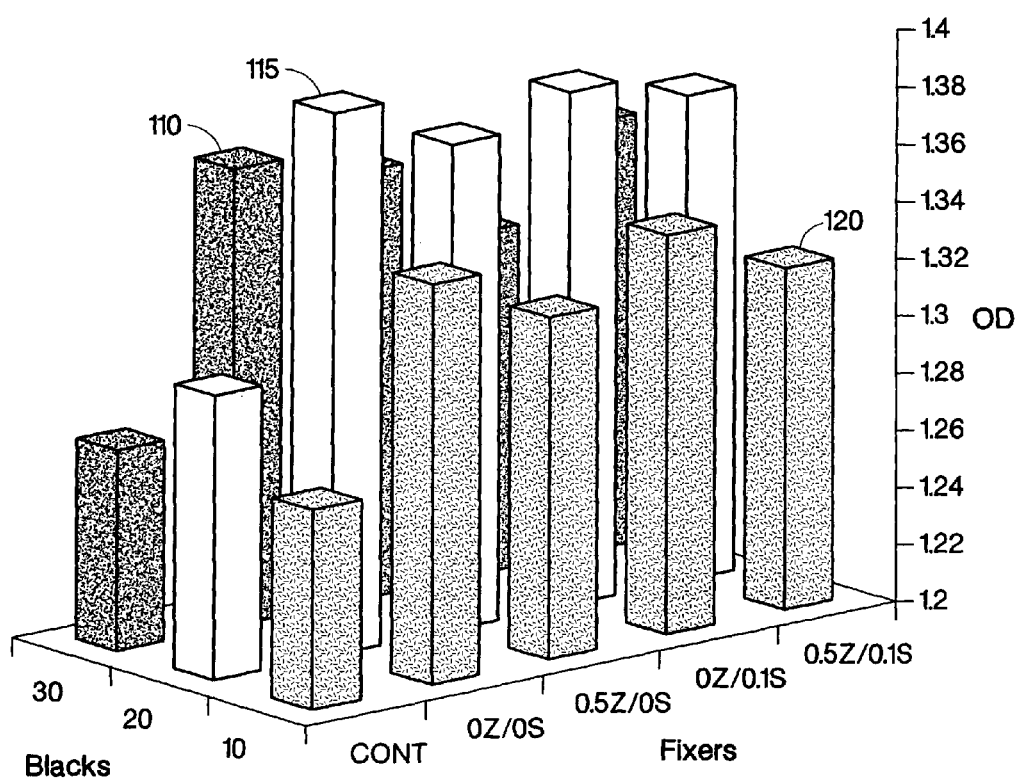
FIG. 1 is a three-dimensional bar graph which shows three parallel sets of optical densities obtained when three separate black inks are mixed with either a conventional fixer as a control or one of several fixers with different combinations of surfactants.

Significant improvements in image quality have been achieved in reactive ink systems by balancing the media penetration rates of fixer and ink relative to each other. More specifically, the penetration rate of the fixer is slowed down by reducing the amount of surfactants in the fixer and/or by selecting surfactants that marginally wet the media. The ink, on the other hand, is formulated to have low surface tension and incorporates highly wetting surfactants to make it quick penetrating. In a preferred embodiment, the combining of the fixer and ink of the present invention has been found to achieve high image saturation and good chroma. Furthermore, with the combination, area fill uniformity has been shown to improve markedly, while a deterioration in drytime has been avoided.

In the present invention, the surfactants in the fixer fluid have been chosen such that the fixer is non-wetting when placed on the print media and remains on the surface of the media until ink arrives. The corresponding ink has been formulated such that it is highly wetting to the media. When ink and fixer meet on the media surface, a very effective crashing of ink colorants has been realized and nearly all the colorant has been deposited on the surface of the media rather than penetrating the media and crashing with the pre-soaked fixer below the surface. Concurrently, the fixer vehicle, upon mixing with the ink vehicle, becomes highly wetting and the mixed vehicle has quickly penetrated the media, leaving the colorants behind. Using this embodiment, an unexpected enhancement in optical density (up to 0.1 OD units for black) and superior area fill uniformity were demonstrated. Moreover, the printed images dried in comparable times relative to the traditional approach.

When fixers and inks that penetrate the media quickly have been used, drytime problems have been effectively solved, but the reactive ink chemistry has not been exploited to its full potential. Such an approach results in only a fraction of the fixer remaining on the surface of the media by the time ink has been applied. Therefore, the buffer capacity of the fixer has been diminished and more of the colorants have penetrated the media along with the vehicle. This has been an inefficient application of reactive ink systems and has lead to decreased chroma and poor area fill uniformity, especially on non-coated media. Slowing down the penetration rate of the fixer alone has not solved the whole problem because even though the desired gains in saturation, chroma and area fill uniformity can be realized, dry time has deteriorated due to the large amount of vehicle that has remained on the media surface. By tuning the penetration rates of fixer and ink, it has been possible to realize the aforementioned gains while maintaining good dry time.

It has been found that to achieve a slow penetration rate for the fixer alone and a quick penetration rate for the mixture of ink and fixer components in fixer and ink vehicle mixture, the following ranges are preferred:

Fixer Composition:
0-30 weight % of cosolvent(s) having a vapor pressure of $1 \times 10^{-3}$ mm Hg or lower at 1 atm and 25° C.;
1-8 weight % of polycations;
0-20 weight % of a buffer at a pH lower than 7;
0-0.5 weight % of an anti-corrosion agent;
0-2 weight % of nonionic surfactants; and
balance an aqueous liquid vehicle such as water.

Ink Composition:
0-3 weight % of a binder system with binders having acid numbers below 20;
0.01-2 weight % of a low HLB surfactant or surfactant combination, HLB below 12;
1-6 weight % colorant, such as a dye or pigment;
1-20 weight % solvents such as glycols, pyrrolidones or glycol ethers;
balance an aqueous liquid vehicle such as water.

A more preferred embodiment of the fixer is as follows:
5-20 weight % 4-methylmorpholine-N-oxide (MMNO), which has a dual role as a co-solvent and a buffering agent, titrated to pH 4-6 with methanesulfonic acid and an addition 6-12 weight % of trimethylolpropane as co-solvent;
1-2 weight % of Floquat FL 2350 and 1-4 weight % of Floquat DEC 50, both polycations;
0-0.1 weight % Cobratec CBT anti-corrosion agent;
0-0.4% Zonyl FSN (a nonionic fluorosurfactant), 0-0.5% Surfynol 465 (a nonionic acetylenic diol-based surfactant), and wetting agent;
balance water.

In the more preferred embodiment of the fixer above, the at least one surfactant is selected from the group consisting of high HLB (hydrophilic-lipophilic balance), non-ionic surfactants, high HLB cationic surfactants, and combinations thereof.

In this application, "high HLB" is defined as having an HLB ratio of greater than or equal to 12. "Low HLB" is defined as having an HLB ratio of less than 12.

In the more preferred embodiment of the fixer above, the polycations have at least one cationic polymer comprising a cationic polyelectrolyte selected from the group consisting of $R_1R_2R_3R_4N^+$, $R_1R_2R_3R_4P^+$, and $R_1R_2R_3R_4As^+$; where R can be H, alkyl or other organic substituent, and where the cationic polyelectrolyte is from 2000 to 40,000 weight average molecular weight.

EXAMPLES

Example 1

Three different black ink-jet ink formulations were tested for printed optical density on paper substrate when used with fixers varying in their surfactant compositions.

The first ink (10) had 0.5% of Surfynol 465 (HLB=13). The second ink (20) had 0.5% of Surfynol SEF (HLB=4-5). The third ink (30) had 0.5% of Surfynol CT-111 (HLB=8-11). All three inks had self-dispersed black pigment, an acrylic resin, a polyurethane resin as well as surfactants and solvents.

The fixers were, as follows: a fixer using a conventional formula (CONT), a surfactant-free fixer (0Z/0S), a fixer containing only Zonyl FSN as surfactant (0.5Z/0S), a fixer containing only a small amount of Surfynol 465 as surfactant (0Z/0.1S), and a fixer containing both Zonyl FSN and Surfynol 465 (05Z/0.1S).

All the new fixers increased black OD significantly over conventional fixer. Mottle was much improved as well. Surfactant-free fixers registered the highest gains in black optical density, followed closely by Zonyl fixers.

To explain the observed enhancement in black optical density, a 1 µL droplet of the fixer was placed on Hewlett Packard Multi-Purpose (HPMP) paper and its penetration rate into the paper was visually inspected. It was observed that the conventional fixer (having as surfactants both 0.02 weight % Zonyl FSN and 0.9 weight % Surfynol 465) spread into the media and disappeared from the surface much faster than the fixers containing as surfactants only Zonyl FSN, which in turn were faster penetrating than the fixer containing no surfactant. Since the optical density appeared to track with the paper penetration rate of the fixers, a conclusion was reached that the fixers that were "waiting" on the surface of the media until ink is dispensed on top of the fixer did a better job of crashing the dyes and pigments in the ink and keeping them on the media surface. More fixer on the media surface at the time the ink is dispensed means more buffer capacity relative to a conventional, fast penetrating fixer, most of which disappears into the media by the time the ink arrives.

In FIG. 1, a three-dimensional bar graph shows three parallel sets of optical densities (measured on the Z axis) obtained when three separate black inks (10, 20 and 30 shown on the Y axis) were mixed with a conventional fixer used as a control and new fixers having the various combinations of surfactants discussed above (shown as CONT, 0Z/0S, 0.5Z/0S, 0Z/0.1S and 0.5Z/0.1S on the X axis).

Example 2

Three different combinations of fixer and magenta ink were printed on conventional substrate. They were applied sequentially on an area to create area fill on conventional substrate.

Figure 2A:
FIG. 2a is a digitized scan of the area fill printed with the mixture of conventional fixer and conventional magenta ink.

Conventional fixer was mixed with conventional magenta ink on substrate by printing the ink on top of the previously applied fixer to create an area fill on the substrate. The quality of the area fill was mottled, having areas of darker and lighter density, and a low optical density (OD=1.23) was measured. FIG. 2a is a digitized scan of the area fill covered by the mixture of conventional fixer and conventional magenta ink.

Figure 2B:
FIG. 2b is a digitized scan of the area fill printed with the mixture of a fixer with a slowed-down media penetration rate and conventional magenta ink.

Fixer of the present invention, having a slowed down media penetration rate, was mixed with conventional magenta ink on a substrate by printing the ink on top of the already applied fixer to make an area fill on the substrate. The quality of the area fill was substantially improved, having little mottle and a substantially increased optical density (OD=1.42). However, because the ink was not fast-penetrating into the substrate, the mixture of ink and fixer stayed on the substrate too long. Therefore, noticeable smudge marks resulted and durability suffered. FIG. 2b is a digitized scan of the area fill covered by the mixture of a fixer with a slowed-down media penetration rate and conventional magenta ink.

Figure 2C:
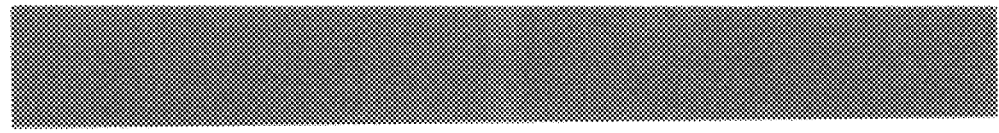
FIG. 2c is a digitized scan of the area fill printed with the mixture of a fixer with a slowed-down media penetration rate and fast-penetrating magenta ink.

Fixer of the present invention with a slowed down media penetration rate was mixed with magenta ink that was altered to make it fast-penetrating. The mixing occurred by printing the ink on top of the already applied fixer to make an area fill on the substrate. The quality of the area fill was improved over both of the previous mixtures in that it had an optical density (OD=1.37) and area fill quality comparable to the area fill covered by the mixture of a fixer with a slowed-down media penetration rate and conventional magenta ink (pictured in FIG. 2b), but it also had a marked durability improvement with minimal smudge marks. FIG. 2c is a photograph of the area fill covered by the mixture of a fixer with a slowed-down media penetration rate and fast-penetrating magenta ink.

Example 3

Two different combinations of fixer and black ink were printed on conventional substrate. They were applied sequentially on an area to create area fill on conventional substrate.

Figure 3A:
FIG. 3a is a digitized scan of the area fill printed with the mixture of conventional fixer and conventional black ink.

Conventional fixer was mixed with conventional black pigment ink on substrate by printing the ink on top of the previously applied fixer to create an area fill on the substrate. The quality of the area fill was mottled, having areas of darker and lighter density, and a low optical density (OD=1.37) was measured. FIG. 3a is a digitized scan of the area fill covered by the mixture of conventional fixer and conventional black pigment ink.

Figure 3B:
FIG. 3b is a digitized scan of the area fill printed with the mixture of a fixer with a slowed-down media penetration rate and conventional black ink.

Fixer of the present invention, having a slowed down media penetration rate, was mixed with conventional black pigment ink on a substrate by printing the ink on top of the already applied fixer to make an area fill on the substrate. The quality of the area fill was substantially improved, having little mottle and a substantially increased optical density (OD=1.47). FIG. 3b is a digitized scan of the area fill covered by the mixture of a fixer with a slowed-down media penetration rate and conventional black pigment ink.

What is claimed is:

1. An inkjet fixer composition, comprising:
   a) an aqueous ink vehicle including at least two co-solvents including from 5 to 20 weight percent of 4-methylmorpholine-N-oxide titrated to a pH of 4-6 with methanesulfonic acid and from 6 to 12 weight percent of trimethylolpropane;
   b) from 1 to 2 weight percent of at least one polyamine polycation;
   c) from 0 to 0.1 weight percent carboxybenzotriazole; and
   d) from 0 to 0.4 weight percent non-ionic fluorosurfactant and from 0 to 0.5% non-ionic acetylenic diol-based surfactant;
   wherein the fixer composition is slow penetrating into a substrate; and
   wherein the fixer composition underprints an ink-jet ink on the substrate, the ink-jet ink comprising:
   a) an aqueous liquid vehicle; and
   b) a colorant;
   wherein the fixer composition vehicle and the ink-jet ink vehicle form a vehicle mixture on the substrate after which the vehicle mixture penetrates into the substrate, and an ink image is formed on the substrate.

2. The inkjet fixer composition of claim 1 wherein the ink-jet ink vehicle is fast-penetrating, relative to the inkjet fixer composition vehicle, into the substrate.

3. The inkjet fixer composition of claim 2 wherein the ink-jet ink comprises:
   a) up to 3 weight percent of a binder system with binders having acid numbers below 20;
   b) from 0.01 to 2 weight percent of at least one low HLB surfactant, wherein low HLB is defined as an HLB less than 12;
   c) from 1 to 6 weight percent colorant, the colorant being selected from dye, pigment and a combination thereof;
   d) from 1 to 20 weight percent solvents selected from the group consisting of glycols, pyrrolidones, glycol ethers and combinations thereof; and
   e) water.

4. A method for printing durable ink-jet ink images, comprising:
   i) jetting a fixer composition onto a substrate, said fixer composition comprising:
      a) an aqueous liquid vehicle including at least two co-solvents including from 5 to 20 weight percent of 4-methylmorpholine-N-oxide titrated to a pH of 4-6 with methanesulfonic acid and from 6 to 12 weight percent of trimethylolpropane;
      b) from 1 to 2 weight percent of at least one polyamine polycation;
      c) from 0 to 0.1 weight percent carboxybenzotriazole; and
      d) from 0 to 0.4 weight percent non-ionic fluorosurfactant and from 0 to 0.5 weight percent non-ionic acetylenic diol-based surfactant; and
   ii) jetting an ink-jet ink onto the substrate of step (i), said ink-jet ink composition comprising:
      a) an aqueous liquid vehicle; and
      b) a colorant
   wherein the fixer composition is slow penetrating into the substrate; and wherein, after the fixer composition is overprinted with the ink-jet ink composition, the fixer composition vehicle and the ink-jet ink vehicle form a vehicle mixture on the substrate after which the vehicle mixture penetrates into the substrate, and an ink image is formed on the substrate.

5. The method of claim 4, wherein the ink-jet ink vehicle is fast-penetrating into the substrate compared to the fixer composition vehicle.

6. The method of claim 4 wherein the inkjet ink further comprises:
   a) up to 3 weight percent of a binder system with binders having acid numbers below 20;
   b) from 0.01 to 2 weight percent of at least one low HLB surfactant, the low HLB surfactant having an HLB below 12 surfactant, wherein low HLB is defined as less than 12;
   c) from 1 to 6 weight percent colorant, the colorant being selected from dye, pigment and a combination thereof;
   d) from 1 to 20 weight percent solvents selected from the group consisting of glycols, pyrrolidones, glycol ethers and combinations thereof; and
   e) water.

7. An inkjet fixer composition, comprising:
   a) from 1 to 8 weight percent of at least one cationic polymer; and
   b) up to 2 weight percent of at least one surfactant selected from the group consisting of nonionic surfactants, cationic surfactants, and combinations thereof; and
   c) an aqueous liquid vehicle including:
      at least two co-solvents selected from i) 4-methylmorpholine-N-oxide titrated to a pH of 4-6 with methanesulfonic acid, and ii) trimethylolpropane;
      at least one polyamine polycation;
      carboxybenzotriazole; and
      a non-ionic fluorosurfactant and a non-ionic acetylenic diol-based surfactant;
   wherein the fixer composition is slow-penetrating into a substrate.

8. The inkjet fixer composition of claim 7 wherein the at least one surfactant is selected from the group consisting of high HLB (hydrophilic-lipophilic balance) nonionic surfactants, high HLB cationic surfactants, and combinations thereof, and wherein high HLB is defined as being greater than or equal to 12.

9. The inkjet fixer composition of claim 7 wherein the at least one cationic polymer comprises a cationic polyelectrolyte selected from the group consisting of $R_1R_2R_3R_4N^+$, $R_1R_2R_3R_4P^+$ and $R_1R_2R_3R_4As^+$, where R can be H, alkyl or other organic substituent, and where the cationic polyelectrolyte is from 2000 to 40,000 weight average molecular weight.

10. The inkjet fixer composition of claim 7 wherein the at least one nonionic surfactant is selected from the group consisting of nonionic fluorosurfactants, nonionic acetylenic diol surfactants, and combinations thereof.

11. The inkjet fixer composition of claim 7 wherein the aqueous liquid vehicle further includes:
   (a) up to 30 weight percent of the co-solvents;
   (b) up to 20 weight percent of a buffer at a pH lower than 7; and
   (c) water.

12. A system for printing durable ink-jet ink images, comprising:
   a) a first ink-jet pen containing a fixer composition, said fixer composition comprising:
      i. from 1 to 8 weight percent of at least one cationic polymer;
      ii. up to 2 weight percent of at least one surfactant selected from the group consisting of nonionic surfactants, cationic surfactants, and combinations thereof; and
      iii. an aqueous liquid vehicle including:
         from 5 to 20 weight percent of 4-methylmorpholine-N-oxide titrated to the pH of 4-6 with methanesulfonic acid; and
         from 6 to 12 weight percent of trimethylolpropane; and
   wherein the ink fixer composition further includes:
      from 1 to 2 weight percent of at least one polyamine polycation;
      up to 0.1 weight percent carboxybenzotriazole;
      up to 0.4 weight percent non-ionic fluorosurfactant; and
      up to 0.5 percent non-ionic acetylenic diol-based surfactant;
   wherein the fixer composition is slow-penetrating into a substrate;
   b) a second ink-jet pen containing an ink-jet ink composition, said ink-jet ink composition comprising:
      i. an aqueous liquid vehicle; and
      ii. a colorant;
   wherein, upon overprinting the fixer composition with the ink-jet ink on the substrate, the fixer composition and the ink-jet ink form a mixture on the substrate;
   and wherein, upon overprinting the fixer composition with the ink-jet ink composition on the substrate, the fixer composition vehicle and the ink-jet ink vehicle form a vehicle mixture on the substrate, after which the vehicle mixture penetrates into the substrate, and an ink image is formed on the substrate.

13. The system of claim 12 wherein the fixer composition is slow-penetrating into the substrate relative to the ink-jet ink composition.

14. The system of claim 12 wherein the at least one surfactant is selected from the group consisting of high HLB (hydrophilic-lipophilic balance) nonionic surfactants, high HLB cationic surfactants, and combinations thereof, wherein high HLB is defined as being greater than or equal to 12.

15. The system of claim 12 wherein the at least one cationic polymer comprises a cationic polyelectrolyte selected from the group consisting of $R_1R_2R_3R_4N^+$, $R_1R_2R_3R_4P^+$ and $R_1R_2R_3R_4As^+$, where R can be H, alkyl or other organic substituent, and where the cationic polyelectrolyte is from 2000 to 40,000 weight average molecular weight.

16. The system of claim 12 wherein the at least one nonionic surfactant is selected from the group consisting of nonionic fluorosurfactants, nonionic acetylenic diol surfactants, and combinations thereof.

* * * * *